(12) United States Patent
Bartsch

(10) Patent No.: US 9,076,007 B2
(45) Date of Patent: Jul. 7, 2015

(54) PORTABLE DATA SUPPORT WITH WATERMARK FUNCTION

(75) Inventor: Armin Bartsch, Landsberg a. Lech (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 1341 days.

(21) Appl. No.: 11/794,452

(22) PCT Filed: Jan. 3, 2006

(86) PCT No.: PCT/EP2006/000020
§ 371 (c)(1),
(2), (4) Date: Feb. 15, 2008

(87) PCT Pub. No.: WO2006/072565
PCT Pub. Date: Jul. 13, 2006

(65) Prior Publication Data
US 2008/0133932 A1 Jun. 5, 2008

(30) Foreign Application Priority Data
Jan. 5, 2005 (DE) .......................... 10 2005 000 796

(51) Int. Cl.
*G06F 21/00* (2013.01)
*G06F 21/62* (2013.01)
(Continued)

(52) U.S. Cl.
CPC ............ *G06F 21/62* (2013.01); *G06F 21/6209* (2013.01); *G06F 21/77* (2013.01); *G06F 21/78* (2013.01); *G06F 2221/0737* (2013.01); *G06Q 20/341* (2013.01); *G06Q 20/357* (2013.01); *G06Q 20/3825* (2013.01);
(Continued)

(58) Field of Classification Search
CPC ....................................................... G06F 21/62
USPC ............................................................ 713/186
See application file for complete search history.

(56) References Cited

U.S. PATENT DOCUMENTS

| 4,734,568 A | 3/1988 | Watanabe |
| 5,796,935 A | 8/1998 | Morrison et al. |

(Continued)

FOREIGN PATENT DOCUMENTS

| DE | 44 03 206 A1 | 8/1995 |
| DE | 693 13 777 T2 | 2/1998 |

(Continued)

OTHER PUBLICATIONS

Jain, Anil K., and Umut Uludag. "Hiding biometric data." Pattern Analysis and Machine Intelligence, IEEE Transactions on Nov. 25, 2003: 1494-1498.*

(Continued)

*Primary Examiner* — Harris Wang
(74) *Attorney, Agent, or Firm* — Workman Nydegger

(57) ABSTRACT

A portable data carrier (1) includes a non-volatile memory (11), a processor (15) and a watermark application (131) executable by the processor (15) which is also stored on the data carrier (1). The watermark application (131) is configured to check (152) data (110, 140) stored on the data carrier (1) or data intended to be stored on the data carrier (1) as to the presence of a digital watermark, or to mark (151) such data (110, 140) with a digital watermark. The check (152) or marking (151) is carried out on the data carrier (1) and after the check (152) or marking (151) the checked or marked data (110, 140) are stored in the non-volatile memory (11) in order to remain there for an indefinite time.

24 Claims, 1 Drawing Sheet

(51) Int. Cl.

| | | |
|---|---|---|
| *G06F 21/77* | (2013.01) | |
| *G06F 21/78* | (2013.01) | |
| *G06Q 20/34* | (2012.01) | |
| *G06Q 20/38* | (2012.01) | |
| *G07F 7/08* | (2006.01) | |
| *G07F 7/10* | (2006.01) | |
| *G07F 7/12* | (2006.01) | |
| *G11B 20/00* | (2006.01) | |

(52) U.S. Cl.
CPC ............ *G07F 7/082* (2013.01); *G07F 7/1008* (2013.01); *G07F 7/125* (2013.01); *G11B 20/00086* (2013.01); *G11B 20/00275* (2013.01); *G11B 20/00492* (2013.01); *G11B 20/00876* (2013.01); *G11B 20/00884* (2013.01)

(56) References Cited

U.S. PATENT DOCUMENTS

| | | | |
|---|---|---|---|
| 6,064,764 A * | 5/2000 | Bhaskaran et al. ............ 382/183 | |
| 6,182,217 B1 | 1/2001 | Sedlak | |
| 6,192,138 B1 * | 2/2001 | Yamadaji ...................... 382/100 | |
| 6,209,092 B1 | 3/2001 | Linnartz | |
| 6,292,874 B1 | 9/2001 | Barnett | |
| 6,802,004 B1 * | 10/2004 | Gross et al. .................... 713/176 | |
| 6,948,068 B2 * | 9/2005 | Lawandy et al. .............. 713/176 | |
| 6,993,133 B1 | 1/2006 | Nonomura et al. | |
| 7,000,113 B1 | 2/2006 | Linnartz | |
| 7,650,646 B2 * | 1/2010 | Asano et al. ..................... 726/32 | |
| 2001/0026377 A1 * | 10/2001 | Ikegami .......................... 358/401 | |
| 2001/0037456 A1 * | 11/2001 | Levy ............................... 713/176 | |
| 2002/0010826 A1 | 1/2002 | Takahashi et al. | |
| 2002/0023218 A1 * | 2/2002 | Lawandy et al. .............. 713/176 | |
| 2002/0080964 A1 * | 6/2002 | Stone et al. ..................... 380/255 | |
| 2003/0046238 A1 | 3/2003 | Nonaka et al. | |
| 2003/0130954 A1 * | 7/2003 | Carr et al. ......................... 705/60 | |
| 2003/0138126 A1 | 7/2003 | Hashimoto | |
| 2003/0150922 A1 | 8/2003 | Hawes | |
| 2003/0191659 A1 | 10/2003 | Okita et al. | |
| 2004/0005078 A1 * | 1/2004 | Tillotson ......................... 382/100 | |
| 2004/0073916 A1 * | 4/2004 | Petrovic et al. .................. 725/18 | |
| 2004/0139324 A1 | 7/2004 | Shin et al. | |
| 2004/0250080 A1 | 12/2004 | Levy et al. | |
| 2005/0063027 A1 * | 3/2005 | Durst et al. ......................... 359/2 | |
| 2008/0133932 A1 * | 6/2008 | Bartsch .......................... 713/186 | |
| 2009/0313155 A1 | 12/2009 | Sawada et al. | |

FOREIGN PATENT DOCUMENTS

| | | |
|---|---|---|
| DE | 698 07 807 | 5/2003 |
| EP | 0 906 700 | 4/1999 |
| EP | 1 047 066 A | 10/2000 |
| EP | 1 130 492 A | 9/2001 |
| EP | 1 215 907 A2 | 6/2002 |
| JP | H 11-331548 A | 11/1999 |
| JP | H 11-341268 A | 12/1999 |
| JP | 2000-184172 A | 6/2000 |
| JP | 2000-207524 A | 7/2000 |
| JP | 2001-216387 A | 8/2001 |
| JP | 2001-283180 A | 10/2001 |
| JP | 2002-305735 A | 10/2002 |
| JP | 2003-16420 A | 1/2003 |
| JP | 2003-296606 A | 10/2003 |
| JP | 2004-64109 A | 2/2004 |
| WO | WO 00/42568 | 7/2000 |
| WO | WO 00/55707 A | 9/2000 |
| WO | WO 01/95206 A | 12/2001 |
| WO | WO 03/081544 A | 10/2003 |

OTHER PUBLICATIONS

Providing environmental information by data carrier + networks nformation ensuring for the visually impaired (1) $ Tatsumi, H. ; Murai, Y. ; Miyakawa, M. ; Tokumasu, S. Systems, Man and Cybernetics, 2005 IEEE International Conference on vol. 4.*
Secure Digital Watermark System Based on Public Key Cipher, Author: Hiroshi Yoshiura, published from Electronic Information Communication Conference on Aug. 13, 1997, in 1997 Base/Boundary Society Meeting Collected Papers issued by Incorporated Association of Electronics Information Communication Conference, pp. 254-255.

* cited by examiner

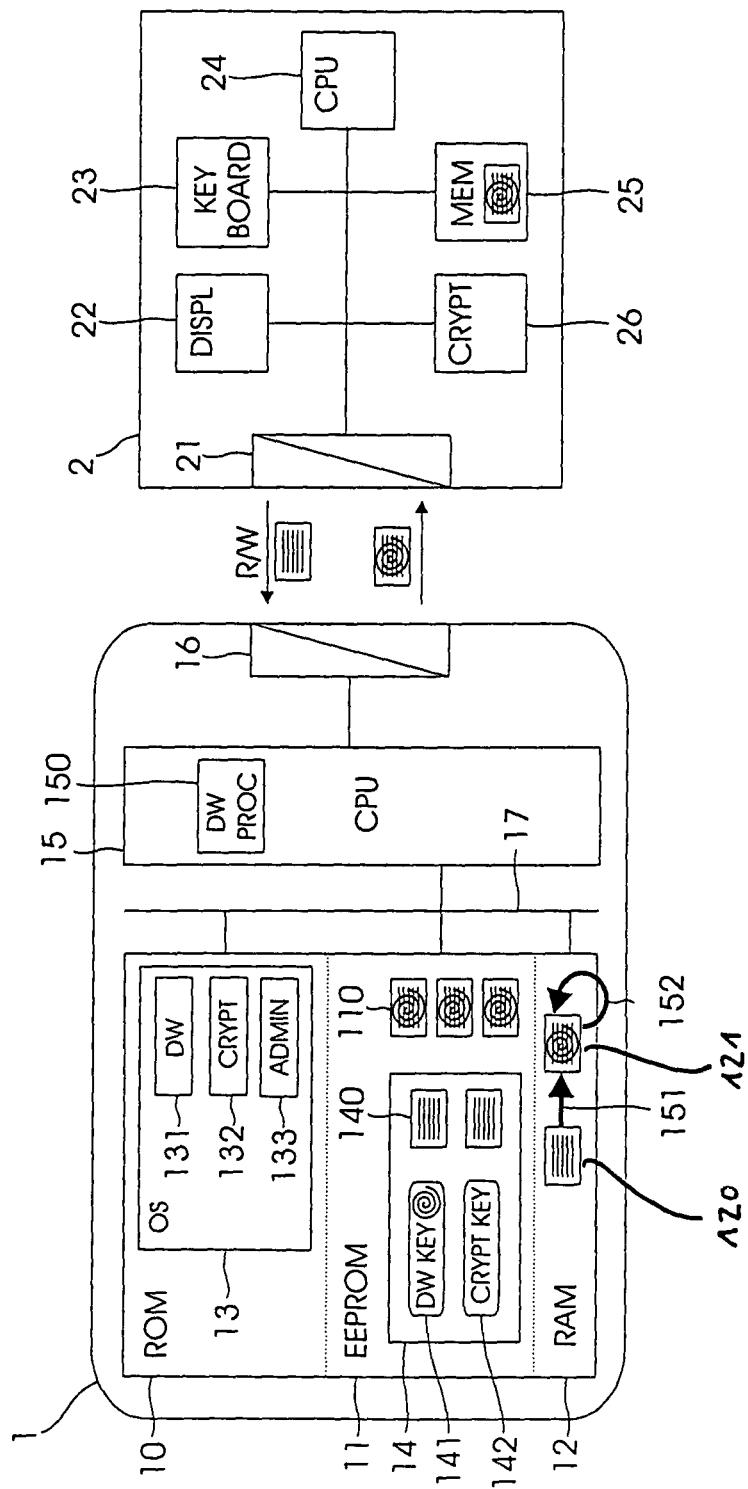

PORTABLE DATA SUPPORT WITH WATERMARK FUNCTION

FIELD OF THE INVENTION

The invention relates to a method and a computer program product for managing data on a portable data carrier, in particular so-called multimedia cards, and such a portable data carrier.

BACKGROUND

With the increasing digitalization of economical, administrative and journalistic processes and processing steps, more and more digital documents are produced and used instead of conventional paper documents because of their more flexible handling. Since data, basically, can be unrestrictedly freely copied, it is often expedient to provide these data with references as to origin or originator in the form of digital watermarks. Such digital watermarks in particular are suitable for protecting and managing rights in digital data, the so-called "Digital Rights Management" (DRM).

Digital watermarks are added to digital documents and files, in order to provide a checkable reference to origin and originator transparent for third parties. For this purpose watermarks are "woven" into the data to be marked or into their binary code such that the watermark cannot be removed without possessing a digital key (at least not without data losses) and it is not easily recognizable as such in the data from outside.

In this connection it is known to transfer data, for the purpose of being marked with a watermark, from a terminal to a separate chip card, to carry out the marking there, and to transfer the marked data back to the terminal, so that the data are present on the chip card only temporarily.

It is also known to store data on so-called multimedia cards, which do not support digital watermarks, but are used in systems which support digital watermarks.

Therefore, it is the problem of the present invention to efficiently and reliably administrate the origin or authorship of the digital data on an open system.

SUMMARY

According to the invention a portable data carrier is provided, which comprises a non-volatile memory, a processor, and a watermark application executable by the processor and also stored on the data carrier. The watermark application is adapted such that it can check data that are stored on the data carrier and/or data that are intended to remain on the data carrier, as to the presence of a digital watermark and/or to mark these data with a digital watermark. The check or marking is carried out on the data carrier, and after being checked or marked the checked or marked data are written into the non-volatile memory, in order to remain there for an indefinite time. If the data were accessed from an external device, they will be transferred to such external device after the check or marking. Data already marked with a first watermark can be additionally marked with a second or further watermark, which e.g. specifies the data carrier.

Since the watermark application is on the portable data carrier and is locally executed there, it cannot be easily misused by persons who merely have access to a terminal to which the data carrier can be connected. Since it is possible to store checked or marked data on the data carrier for an indefinite time, the portable data carrier can also be used as a portable expansion for a DRM system or as a multimedia card that supports information about the origin or authorship of data. Multimedia cards have at least one processor for administrative purposes and/or for implementing security functionalities. This processor can also be advantageously used for realizing the watermark functionality.

When the data carrier is connected with a terminal—e.g. a stationary workstation or a mobile notebook—via a suitable interface, the watermark application can be adapted such that it carries out a check or marking of the data stored in its non-volatile memory as soon as these data are accessed from an external device. In this way unmarked data cannot leave the portable data carrier.

Basically, it is also possible to store unmarked data on a data carrier according to the invention. Therefore, in addition it is expedient to create an especially secured memory on the data carrier, wherein the unmarked data are stored. An access to such an especially secured memory area can be secured with the help of a secret PIN, a biometric authentication, or other security requests. Such a secure memory can be realized in the form of an additional non-volatile memory module or a secure memory area in the already existing non-volatile memory of the data carrier.

In the secure memory there can also be deposited the key, which is used for checking and/or marking data with the watermark, in order to prevent a stealing of the key by unauthorized persons.

It is expedient to create a cryptography application on the data carrier as an additional security feature, which is executable on the processor, and to encrypt data before they are transferred from the data carrier to a terminal, and/or to decrypt received encrypted data.

In a preferred embodiment the watermark application is started in the processor of the data carrier as a background process, which permanently monitors the data on the data carrier and carries out a check or marking of the data that is transparent for the user.

With another variant it is possible to operate the watermark application in an access-controlled fashion, so that a respective watermark process is activated only in the case of direct read and/or write accesses to the data of the data carrier for checking or marking the data. For example when storing data in the non-volatile memory they are immediately checked and/or marked.

Furthermore, it is expedient to adapt the watermark application such that data can be distinguished according to certain attributes, such as e.g. data type, file name, owner, etc, and to accordingly check them as to specific attribute-dependent watermarks or to mark them with such. In this respect it is also possible to allocate individual watermarks to different data carriers according to the invention, so that in data that have been reproduced in another way, illegally recorded, or duplicated, at least one digital watermark of the copying data carrier is traceably included and, optionally, also the watermark of the device on which the data were originally produced.

BRIEF DESCRIPTION OF THE DRAWING

Further features of the invention appear from the following description of various examples and alternative embodiments according to the invention. Reference is made to FIG. 1 that is the only FIGURE and shows a data carrier according to the invention in interaction with a stationary terminal.

DETAILED DESCRIPTION OF VARIOUS EMBODIMENTS

As mentioned at the outset, digital watermarks are woven into digital documents and data with the help of a secret digital key, transparent for third parties and irreversible as a checkable reference to origin or originator in data. The copying of data provided with watermarks as such shall not be prevented, only the origin or the authorship of the data and with that also the lawful possession shall be ascertainable. Ideally, watermarks are so robust that they remain undamaged when undergoing usual data manipulations and transformations such as e.g. conversion and compression. Watermark methods for picture data are, for example, Eikonamark, SysCoP 1.2 or PictureMarc. The term "digital watermark" used in this document in particular does not comprise conventional cryptographic signatures or hash values, because normally these are attached to the data to be protected and are visible for third parties.

Digital watermarks are introduced into digital data, which basically can be copied without loss of quality, for proving authenticity, originality and authorship, in order to ensure the protection of copyrights—for example in a DRM system—and for administrating them. Accordingly, an important economic field of application is, inter alia, the use as a copy protection for multimedia data (e.g. picture data, video and audio data and other documents) or software programs. In software programs at least the data embedded in the software can be marked with a watermark.

For checking a file as to the presence of a certain digital watermark or for marking the file with a digital watermark a digital key is necessary, and under the use of this key a watermark algorithm transparently inserts the respective watermark in a file or verifies it in it. Since according to today's prior art, in general, these keys are symmetric keys, a person who has come into the possession of the key without authority can use this key for the unauthorized marking of documents and thus for forging or disguising an authorship. This means that in large computer systems in companies or public authorities, where many persons have access to a watermark functionality, there is a high risk of misuse.

Therefore, it is more reasonable to use an external device or a portable data carrier, e.g. a chip card 1 (smart card) provided with a processor, in order to check 152 or to produce 151 digital watermarks in the protected environment of the data carrier.

Microprocessor chip card 1 is connected with terminal 2 via corresponding communication interfaces 16, 21, the terminal being e.g. a workstation, a portable computer (laptop, notebook), a personal digital assistant (PDA), or a mobile phone. In this way the security-critical watermark functionality is protected from an unauthorized access to terminal 2.

Chip card 1 comprises a processor 15 and a memory array, which communicate with each other via an internal BUS system 17. The memory array comprises a permanent memory 10 (ROM), a non-volatile, rewritable memory 11 (EEPROM or flash, or the like) and a volatile memory 12 (RAM), the contents of which are deleted as soon as the power supply to chip card 1 is interrupted. In ROM memory 10 the invariable operating system 13 is provided, e.g. STARCOS, STARSIM, JAVA etc, which provides the substantial functionalities for operating chip card 1. These include, for example, a cryptographic application 132, various administration applications 133, and a watermark application 131. It is obvious, that other portable data carriers or chip cards 1 are also thinkable, the operating system 13 of which is differently structured, or the applications 131, 132, 133 of which are organized different than the structure shown in FIG. 1 and, for example, are located completely or partly in non-volatile memory 11.

Non-volatile EEPROM memory 11 is provided for storing documents and data 110, 140 and to keep them ready there for an indefinite time for being fetched by a terminal 2. In EEPROM memory 11 are contained both data 110 marked with a watermark and unmarked data 140. In FIG. 1 the data 110 provided with watermarks are marked by a spiral symbol. This, however, only serves for illustrating because the presence of a digital watermark usually cannot be seen by looking at a file.

In the embodiment of the invention shown in FIG. 1 the unmarked data 140 are stored in an especially secured memory area 14 of the EEPROM memory 11 in order to protect them from unauthorized access, since they do not yet have any reference to the originator in the form of a watermark. In addition, in secured memory area 14 further security-relevant data are contained, such as e.g. digital watermark key 141 for watermark application 131 or cryptography key 142 for cryptography application 132. Memory area 14 can only be addressed, when the user of the chip card 1 especially authorizes himself, e.g. by means of a PIN, a "pass phrase", or via a biometric or other authentication.

Deviating from the memory array shown in FIG. 1, it is also possible to leave out the especially secured memory area 14 and to deposit its data contents in the usual EEPROM memory 11. Likewise, EEPROM memory 11 as a whole can be especially secured, or besides the usual EEPROM memory 11 a second, especially secured EEPROM memory for the above purposes can be provided.

The functions of the operating system 13 are provided in a machine language format understandable for the processor 15 (CPU), so that they can be executed by the processor 15. In particular, the watermark application 131 is executed on the processor 15 in the form of a watermark process 150. The watermark processor 150 exclusively operates on the basis of the data 110, 140, 120, 121 stored on the chip card 1 and for reasons of security does not access the data of the terminal 2.

It realizes mainly two important functions, namely checking 152 relevant data 110, 140 as to the presence of a certain watermark, and marking 151 unmarked data 140 with a watermark. The data coming from the terminal can be provided with a watermark before they are stored. These functions can be carried out under the utilization of RAM memory 12 as a main memory, so that the checked or marked data 152 are automatically deleted when the connection between chip card 1 and terminal 2 is interrupted. After the check 152 or the marking 151 the checked or marked data 110, 140 are written into the EEPROM memory 11 in order to remain there for an indefinite time.

Terminal 2 can be a conventional computer provided with a communication interface 21 for the data transfer with chip card 1, a display device 22 such as e.g. a monitor, an input unit 23 such as e.g. a keyboard, a processor 24, a memory 25 that can contain documents and data, and, optionally, a cryptography unit 26 for encrypting and decrypting documents.

As a portable data carrier 1 besides the chip card 1 shown in FIG. 1 all those portable storage media are suitable which are provided with a processor. These can also be mass memory cards, USB dongles, tokens, sticks and similar storage media with non-volatile, rewritable memory, provided that they comprise a microprocessor. The microprocessor often serves for executing the administrative functionalities concerning the memory, such as e.g. controlling the communication with an external device. Such a processor can also be adapted to execute a watermark application 131 according to the invention or to provide the appropriate functionalities.

It may be especially advantageous to encrypt data to be transferred or to decrypt encrypted data by suitable cryptographic functionalities 132, 26. Deviating from the representation in FIG. 1, the security-relevant functionalities, such as e.g. the watermark application 131 and the cryptography application 132 of the chip card 1, can also be provided by a specialized coprocessor, which is optimized as to fast execute such arithmetic operations. Because of the similar operations, possibly, a cryptographic coprocessor can also be used here for realizing the watermark functionality.

After the data 110, 140 that are to be checked or to be marked underwent a check 152 or a marking 151 in volatile RAM memory 12, these data are stored as marked data 110 or unmarked data 140 in the EEPROM memory 11—or, optionally, in a secure memory area 14 or further memories—for remaining there for an indefinite time. The data are stored in EEPROM memory 11 even when they are directly retransferred to terminal 2 immediately after the check 152 or marking 151.

There are various variants of the embodiment of the watermark application 131 or of the watermark process 150. The processing of data by the watermark process 150 can be carried out as a permanent background process independently of read or write accesses (R/W), as long as the chip card 1 is connected with terminal 2 and is supplied with electric power. Here the process 150 can run in a continuously repeating fashion or be started at predetermined regular points of time. All data 140, 110 that are stored on the data carrier 1 at this point of time or are to be stored, are checked 152 as to the existence of a certain watermark and marked 151, if the watermark is not present in the data 151.

Likewise, data 110 the authorship of which is to be determined, can be checked 152 as to a certain watermark and depending on the presence of the watermark are further processed in a certain fashion, for example are deleted, locked, encrypted, copied, or otherwise manipulated.

Moreover, the watermark process 150 can be operated in an access-controlled fashion, by triggering the processing of data only when terminal 2 carries out a read/write access (R/W) to the data 110, 140 of the data carrier 1. For example, all data are immediately checked/marked, when they are written into the data carrier 1. Processing the data 110, 140 may be made dependent on certain additional conditions, e.g. on the data type, the type of access or on the access privileges of certain users or processes.

Deviating from the embodiment illustrated in FIG. 1, a watermark application 131 according to the invention can use a plurality of watermarks for checking 152 and marking 151, the choice of a certain watermark being made dependent on certain properties of the data, e.g. on the data type (e.g. document type, audio or video data, picture data, executable program data, etc), or for different types of access, accessing persons, or terminals different watermarks can be used.

Moreover, with many applications it is expedient to process only selected data. When the data 110, 140 stored on the data carrier 1, for example, are organized in a differentiating file system, which logs file names, file types or other file attributes (e.g. access authorizations, signatures, manipulation time, etc), the processing of the data 110, 140 can be limited to certain of these attributes. For example, there can be determined that only certain picture, video, or audio files are checked 152 or marked 151. In a hierarchically organized file system the processing can be additionally restricted to certain subdirectories. Likewise, in certain cases it is thinkable to process certain data 110, 140 or directories in the background independently of data accesses, while other data 110, 140 or directories are processes in an access-controlled fashion. In dependence thereof it is expedient to use different watermarks.

Although, in principle, it is provided that all checked or marked data are deposited in the non-volatile EEPROM memory 11, it is obvious that a data carrier 1 according to the invention provided with a watermark functionality can also be used for processing temporary data, which are transferred from terminal 2 to data carrier 1, are checked 152 or marked 151 there, and then again are directly provided to terminal 2. In this respect, data carrier 1 can also represent a "black box system", which is in connection with terminal 2 and carries out the functions according to the invention transparent for a user.

The invention claimed is:

1. A method for managing data on a smart card having a microprocessor, the method comprising the steps of:
   checking data for the presence of a digital watermark therein; and
   marking data with a digital watermark if a digital watermark is not present in the checked data,
   wherein the steps of checking data and marking data are carried out on said smart card having the microprocessor; and
   storing the digitally watermarked data in a non-volatile memory of said smart card having the microprocessor,
   wherein, in the step of checking data for the presence of a digital watermark, in response to the data being determined to be marked with a first watermark, the data are further marked with a second watermark, the second watermarking specifying the data carrier.

2. The method according to claim 1, wherein the data are checked or marked when they are accessed from outside the smart card having the microprocessor.

3. The method according to claim 1, wherein the data are checked or marked on being stored in the non-volatile memory.

4. The method according to claim 1, wherein the data are stored in a secure non-volatile memory of the smart card having the microprocessor when they are unmarked.

5. The method according to claim 1, wherein, for checking or marking a key is used, which is stored in a secure non-volatile memory.

6. The method claim 4, wherein, before being accessed, the secure non-volatile memory is activated by at least one of a PIN, a biometric access code, and other authentication.

7. The method according to claim 1, wherein before being transferred the data are cryptographically encrypted.

8. The method according to claim 1, wherein the method is operated on the smart card having the microprocessor as a background process, which runs permanently or in regular intervals.

9. The method according to claim 1, wherein the method only runs in the case of a read/write access to data stored in the non-volatile memory.

10. The method according to claim 1, wherein only certain data types are checked or marked or that certain file types are checked or marked as to certain watermarks.

11. A smart card having a microprocessor for managing data, the smart card comprising a processor and a watermark application executable by the processor,
   wherein the smart card is configured to (i) check data as to the presence of a digital watermark and (ii) mark such data with a digital watermark if a digital watermark is not present in the checked data, and
   wherein said smart card having the microprocessor is configured to check and mark such data with the help of the watermark application executed by the processor, and to store said checked and marked data in a non-volatile memory of said smart card having the microprocessor,
   wherein, in checking the data for the presence of a digital watermark, in response to the data being determined to be marked with a first watermark, the data are further marked with a second watermark, the second watermarking specifying the data carrier.

12. The smart card having the microprocessor according to claim 11, wherein the smart card having the microprocessor is adapted to check or to mark the data with the help of the watermark application when they are accessed from outside the smart card having the microprocessor.

13. The smart card having the microprocessor according to claim 11, wherein the smart card having the microprocessor is configured to check or to mark the data with the help of the watermark application when they are stored in the non-volatile memory.

14. The smart card having the microprocessor according to claim 11, wherein the smart card having the microprocessor comprises a secure memory, which is secured by at least one of a PIN, a biometric access code, and other authentication.

15. The smart card having the microprocessor according to claim 14, wherein the secure memory forms a memory area of the nonvolatile memory.

16. The smart card having the microprocessor according to claim 14, wherein in the secure memory the data are stored when they are unmarked.

17. The smart card having the microprocessor according to claim 14, wherein the watermark application uses a digital key for checking or marking, which is stored in the secure memory.

18. The smart card having the microprocessor according to claim 11, wherein the smart card having the microprocessor comprises an interface for the data communication and a cryptography application, the interface being configured to transfer and receive data and the cryptography application being configured to encrypt or decrypt the data.

19. The smart card having the microprocessor according to claim 11, wherein the smart card having the microprocessor is adapted to operate the watermark application on the processor as a background process, which runs permanent or in regular intervals.

20. The smart card having the microprocessor according to claim 11, wherein the smart card having the microprocessor is configured to run the watermark application when the data stored in the nonvolatile memory is accessed from outside the smart card having the microprocessor.

21. The smart card having the microprocessor according to claim 11, wherein the smart card having the microprocessor is configured to check or to mark only selected data types with the help of the watermark application or to check or to mark selected data types as to certain watermarks with the help of the watermark application.

22. A non-transitory computer-readable medium encoded with a computer program product, which is capable of executing a method according to claim 1.

23. The method according to claim 1, wherein the data are checked for the presence of a digital watermark after they are accessed from outside the smart card.

24. The smart card having the microprocessor according to claim 11, wherein the data are checked for the presence of a digital watermark after they are accessed from outside the smart card.

* * * * *